(12) United States Patent
Kim

(10) Patent No.: US 9,419,429 B2
(45) Date of Patent: Aug. 16, 2016

(54) POWER SUPPLY APPARATUS AND CONTROL METHOD THEREOF

(71) Applicant: Samsung Electronics Co., Ltd., Suwon-si (KR)

(72) Inventor: Sun Jin Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 528 days.

(21) Appl. No.: 13/666,500

(22) Filed: Nov. 1, 2012

(65) Prior Publication Data

US 2013/0134800 A1    May 30, 2013

(30) Foreign Application Priority Data

Nov. 25, 2011    (KR) .......................... 10-2011-0124540

(51) Int. Cl.
 *H01H 37/00* (2006.01)
 *H02H 5/04* (2006.01)
 *H01H 9/54* (2006.01)
 *H01H 33/59* (2006.01)

(52) U.S. Cl.
 CPC ............... *H02H 5/042* (2013.01); *H01H 9/548* (2013.01); *H01H 33/596* (2013.01); *Y10T 307/773* (2015.04)

(58) Field of Classification Search
 CPC .............. H01H 37/00; H02J 3/14; H02J 7/00; B60Q 1/00; H05B 1/02
 USPC ........ 307/117, 116, 66, 39, 35; 219/497, 608, 219/482, 494, 501, 506, 491; 126/587, 597; 340/449, 438; 374/132, 102, 107; 320/144, 132; 318/484, 434
 See application file for complete search history.

(56) References Cited

U.S. PATENT DOCUMENTS

| | | | | |
|---|---|---|---|---|
| 5,449,884 A | * | 9/1995 | Lee | 219/497 |
| 5,925,998 A | * | 7/1999 | Olson | 318/484 |
| 2005/0269991 A1 | * | 12/2005 | Mitsui et al. | 320/132 |
| 2010/0093445 A1 | * | 4/2010 | Mattice et al. | 463/46 |
| 2012/0001746 A1 | * | 1/2012 | Kamiya | 340/449 |

FOREIGN PATENT DOCUMENTS

| | | |
|---|---|---|
| JP | 2008-165769 | 7/2008 |
| KR | 10-2009-0039143 | 4/2009 |
| KR | 20-2009-0010281 | 10/2009 |
| KR | 10-2011-0026549 | 3/2011 |

* cited by examiner

*Primary Examiner* — Jared Fureman
*Assistant Examiner* — Joel Barnett
(74) *Attorney, Agent, or Firm* — Staas & Halsey LLP

(57) ABSTRACT

A power supply apparatus, which includes a load, an outside power source to supply the load with a power voltage and a switch electrically connected between the load and the outside power source, including a temperature detector unit configured to detect a temperature of the load, a no-power contact point unit provided with a relay, which is electrically connected between the load and the switch, and configured to activate a contact point of the relay before the power voltage is applied to the load, and a control unit configured to turn on the switch according to a power supply command that is input from an outside and configured to control an on/off of the switch according to the temperature of the load detected.

21 Claims, 7 Drawing Sheets

POWER SUPPLY APPARATUS AND CONTROL METHOD THEREOF

CROSS-REFERENCE TO RELATED APPLICATIONS

This application claims the priority benefit of Korean Patent Applications No. 2011-0124540, filed on Nov. 25, 2011 in the Korean Intellectual Property Office, the disclosure of which is incorporated herein by reference.

BACKGROUND

1. Field

Embodiments relate to a power supply apparatus for supplying or shutting off a power voltage to a load according to the temperature of the load, and a control method thereof.

2. Description of the Related Art

In general, a power supply apparatus is designed to supply a power voltage to a load, and to shut off the power voltage supplied to the load when the temperature of the load increases beyond an abnormal range of temperature. Referring to FIG. 1, a conventional power supply apparatus includes a load 110, an outside power source to supply the load 110 with a power voltage, a relay RL electrically connected between the load 110 and the outside power source, and a control unit 120 to output a signal serving to activate or inactivate a contact point the relay RL.

A node at one side of a coil of the relay RL is connected to a driving power source Vcc, and a node at the other side of the coil of the relay RL is connected to a collector node of a transistor TR. A base node of the transistor TR is connected to an output node of the control unit 120, and an emitter node of the transistor TR is grounded. According to the signal output from the control unit 120, the coil of the relay RL is driven, and the contact point of the relay RL is activated or inactivated. The control unit 120 may output a signal serving to inactivate the contact point of the relay RL upon satisfaction of a predetermined requirement or according to an input from an outside.

However, the conventional power supply apparatus is configured on the assumption that an Alternating Current (AC) power is supplied to the load 110. Accordingly, if a Direct Current (DC) power is supplied to the load, an arc may occur as a result of a high voltage. In addition, if the relay RL is broken, or the output node of the control unit 120 is broken, an alternate to the relay RL or the output node that is able to shut off the power voltage supplied to the load is absent and thus a fire is started due to the overheated load.

SUMMARY

In an aspect of one or more embodiments, there is provided a power supply apparatus capable of preventing an arc from occurring due to a high voltage, controlling the heat capacity being supplied to a load by detecting the temperature of the load, and inactivating a contact point of a relay when the load is overheated or a high voltage is applied to the load, and a control method thereof.

In accordance with one aspect of the present disclosure, a power supply apparatus, which includes a load, an outside power source to supply the load with a power voltage and a switch electrically connected between the load and the outside power source, includes a temperature detector unit, a no-power contact point unit and a control unit. The temperature detector unit may be configured to detect a temperature of the load. The no-power contact point unit may be provided with a relay, which is electrically connected between the load and the switch, and may be configured to activate a contact point of the relay before the power voltage is applied to the load. The control unit may be configured to turn on the switch according to a power supply command that is input from an outside and configured to control an on/off of the switch according to the temperature of the load detected.

The power supply apparatus may further include a comparator unit configured to compare the detected temperature of the load with a reference temperature that is set in advance. The comparator unit may output a signal to activate the contact point of the relay if the detected temperature of the load is lower than the reference temperature, and the no-power contact point unit may activate or inactivate the contact point of the relay according to the output of the comparator unit.

The control unit may turn off the switch if the detected temperature of the load is higher than a target temperature that is set in advance, and turn on the switch if the detected temperature of the load is lower than the target temperature.

The control unit may output a signal to inactivate the contact point of the relay according to the detected temperature of the load, and the no-power contact point unit may inactivate the contact point of the relay according to at least one of the output of the comparator unit and the output of the control unit.

The control unit, if the detected temperature of the load represents a first error state at which the detected temperature of the load is higher than an abnormal temperature that is set in advance, may output the signal to inactivate the contact point of the relay.

The comparator unit, if the detected temperature of the load represents a second error state at which the detected temperature of the load is higher than the reference temperature that is set in advance, may output a signal to inactivate the contract point of the relay.

The reference temperature may be set to be in a range above the abnormal temperature The control unit, if a variation of the detected temperature of the load for a unit time represents a third error state at which the variation is larger than an abnormal variation that is set in advance, may output the signal to inactivate the contact point of the relay.

The power supply apparatus may further include a high voltage detector unit configured to detect an intensity of the power voltage. The control unit, if the detected intensity of the power voltage represents a fourth error state at which the detected intensity of the power voltage is greater than an abnormal voltage that is set in advance, may output the signal to inactivate the contact point of the relay.

The power supply apparatus may further include a memory unit configured to store a temperature table, which enables the control unit to trace the detected temperature of the load, and information on at least one of the first error state, the second error state, the third error state, and the fourth error state.

The power supply apparatus may further include an alarming unit configured to report at least one of the first error state, the second error state, the third error state, and the fourth error state to an outside.

In an aspect of one or more embodiments, there is provided a method of controlling a power supply apparatus, which includes a load, an outside power source to supply the load with a power voltage, a switch electrically connected between the load and the outside power source, a temperature detector unit configured to detect a temperature of the load and a no-power contact point unit having a relay electrically connected between the load and the switch, is as follows. The no-power contact point unit may activate a contact point of the relay before the power voltage is applied to the load. The control unit may turn on the switch according to a power supply command that is input from an outside. The control unit may control an on/off of the switch according to the temperature of the load detected.

In the activating of the contact of the relay, a comparator unit may compare the detected temperature of the load with a reference temperature that is set in advance, and may output a signal to activate the contact point of the relay if the detected temperature of the load is lower than the reference temperature, and the no-power contact point unit may activate or inactivate the contact point of the relay according to the output of the comparator unit.

In the controlling of the on/off of the switch, the control unit may turn off the switch if the detected temperature of the load is higher than a target temperature that is set in advance, and may turn on the switch if the detected temperature of the load is lower than the target temperature.

The method may further include the following. The control unit may output a signal to inactivate the contact point of the relay according to the detected temperature of the load. The no-power contact point unit may inactivate the contact point of the relay according to at least one of the output of the comparator unit and the output of the control unit.

In the inactivating of the contact point of the relay, the control unit, if the detected temperature of the load represents a first error state at which the detected temperature of the load is higher than an abnormal temperature that is set in advance, may output the signal to inactivate the contact point of the relay.

In the inactivating of the contact point of the relay, the comparator unit, if the detected temperature of the load represents a second error state at which the detected temperature of the load is higher than the reference temperature, may output a signal to inactivate the contract point of the relay.

In the inactivating of the contact point of the relay, the reference temperature may be set to be in a range above the abnormal temperature.

In the inactivating of the contact point of the relay, the control unit, if a variation of the detected temperature of the load for a unit time represents a third error state at which the variation is larger than an abnormal variation that is set in advance, may output the signal to inactivate the contact point of the relay.

In the inactivating of the contact point of the relay, a high voltage detector unit may detect an intensity of the power voltage, and the control unit, if the detected intensity of the power voltage represents a fourth error state at which the detected intensity of the power voltage is greater than an abnormal voltage that is set in advance, may output the signal to inactivate the contact point of the relay.

The method may further include reporting at least one of the first error state, the second error state, the third error state and the fourth error state to an outside.

As described above, an arc that occurs due to the supply of a high voltage is prevented. In addition, the temperature of a load is detected so that the heat capacity being supplied to the load is controlled by the on/off of a switch using the temperature, thereby ensuring the stability in supplying a power. In addition, if the load is overheated, or a high voltage is supplied, the contact point of the relay is inactivated, thereby preventing a fire from being developed.

In an aspect of one or more embodiments, there is provided a power supply apparatus including a switch electrically connected between a load and an outside power source; a temperature detector configured to detect a temperature of the load; a no-power contact point unit provided with a relay, which is electrically connected between the load and the switch, and configured to activate a contact point of the relay before power is applied to the load; a control unit, receiving a power supply command, configured to turn on the switch in response to the power supply command, and configured to control an on/off of the switch according to the temperature of the load detected; and a comparator unit configured to compare the detected temperature of the load with a reference temperature that is set in advance, wherein the comparator unit outputs a signal to activate the contact point of the relay if the detected temperature of the load is lower than the reference temperature, and the no-power contact point unit activates or inactivates the contact point of the relay according to the output of the comparator unit, and wherein the control unit outputs a signal to inactivate the contact point of the relay according to the detected temperature of the load, and the no-power contact point unit inactivates the contact point of the relay according to at least one of the outputs of the comparator unit and the output of the control unit.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
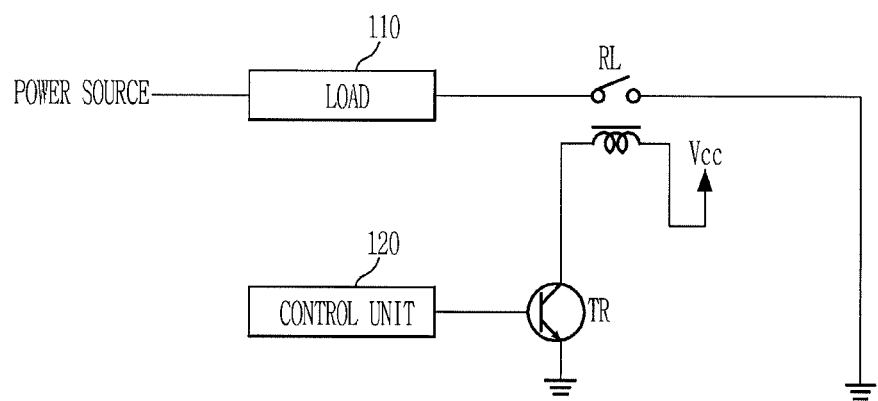
FIG. 1 is a circuit diagram schematically illustrating a conventional power supply apparatus.

Reference will now be made in detail to embodiments, examples of which are illustrated in the accompanying drawings, wherein like reference numerals refer to like elements throughout.

Figure 2:
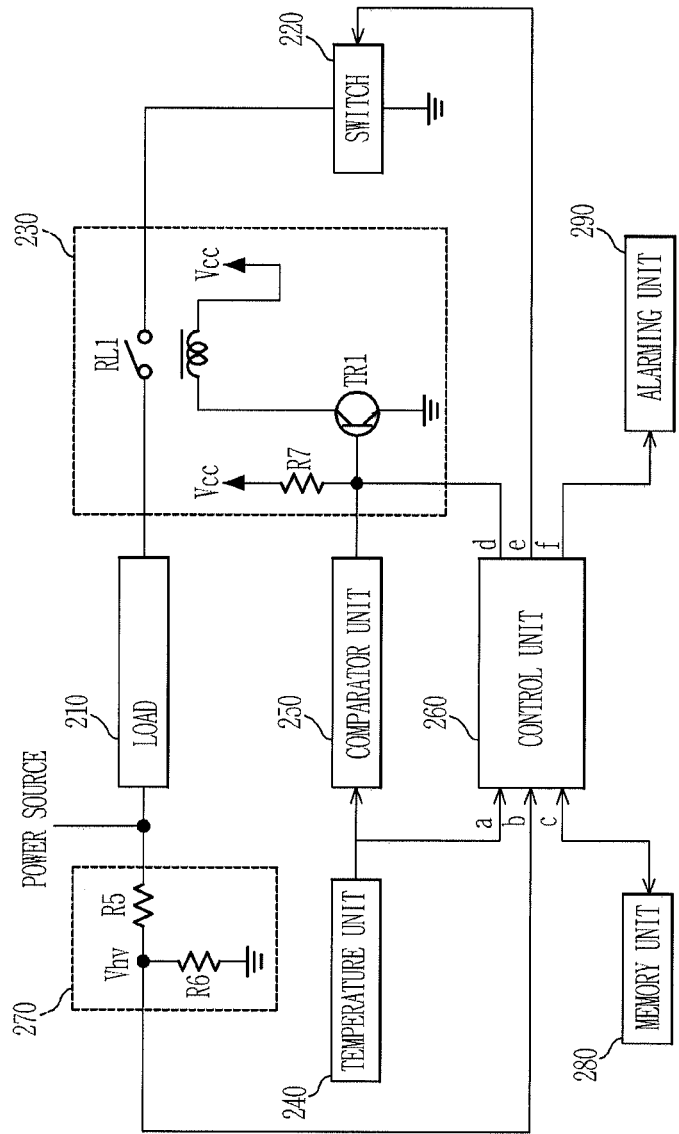
FIG. 2 is a circuit diagram schematically illustrating a power supply apparatus in accordance with an embodiment.

FIG. 2 is a circuit diagram schematically illustrating a power supply apparatus in accordance with an embodiment. Referring to FIG. 2, a power supply apparatus includes a load 210, an outside power source to supply the load 210 with a power voltage, a switch 220 electrically connected between the load 210 and the outside power source, a temperature detector unit (temperature unit or temperature detector) 240 to detect the temperature of the load 210, a no-power contact point unit 230 electrically connected between the load 210 and the switch 220, a comparator unit (comparator) 250 to compare an output of the temperature detector unit 240 with a reference voltage, a control unit (controller) 260 to control the operation of the power supply apparatus, a high voltage detector unit (high voltage detector) 270 to detect the intensity of the power voltage, a memory unit (memory) 280 to store information on an error state, and an alarming unit (alarm) 290 to report the error state to an outside.

The load 210 may be implemented using an inductive load, a resistive load or a combined type load of the inductive load and the resistive load that are used for a general power consumption apparatus. A motor, as an example of the inductive motor, may be used for home electronic appliances. When an Alternative Current (AC) power is applied to an inductive load, a power loss may occur due to the phase difference of voltage and current. In particular, an inductive load based on a coil, such as solenoids, may have the vibration and noise due to an alternating magnetic force. Accordingly, if a motor having a great power consumption is supplied with a Direct Current (DC) power, a target rotational frequency and a target torque are controlled by varying the voltage and the frequency, thereby reducing the energy consumption In addition, a heater may be used as an example of the resistive load. In order to increase the capacity of the heater, a high voltage DC power is desired to be supplied in terms of the spatial efficiency and cost efficiency for cores. A power supply apparatus according to an aspect o one or more embodiments, an arc, which is caused by a high voltage DC power, is prevented from occurring, even if a high voltage DC power is supplied to the load 210, and also the safety is ensured in supplying the heat capacity to the load 210.

The outside power source supplies a DC power or an AC power to the load 210. In particular, in a case that the outside power source supplies a high voltage DC power, an aspect of one or more embodiments prevents an arc in the manner described above, and in a case that the outside power source supplies an AC power to the load 210, an aspect of one or more embodiments ensures the stability in supplying a power.

The switch 220 may be implemented as a semiconductor circuit of an Insulated Gate Bipolar Transistor (IGBT) or a Field Effect Transistor (FET), which is used in a general power consumption apparatus, achieving a high speed switching. The switch 220 is electrically connected between the load 210 and the outside power source. The switch 220 applies the power voltage to the load 210 while being turned on, and shuts off the power voltage applied to the load 210 while being turned off.

The no-power contact point unit 230 is provided with a relay RL1 connected between the load 210 and the switch 220 and with a transistor TR1 to drive a coil of the relay RL1 according to an output signal of the comparator unit 250 and the control unit 260.

A node at one side of the contact point of the relay RL1 is connected to the load 210, and a node at the other side of the contact point of the relay RL1 is connected to the switch 220, thereby forming the no-power contact point. A node at one side of the coil of the relay RL1 is connected to a driving power source Vcc, and a node at the other side of the coil of the relay RL1 is connected to a collector node of the transistor TR1.

An emitter node of the transistor TR1 is grounded, and a base node of the transistor TR1 is connected to an output node of the comparator unit 250 and to an output node (d) of the control unit 260. In addition, a node at one side of a seventh resistance R7 is connected to the output node (d) of the control unit 260, and a node at the other side of the seventh resistance R7 is connected to the driving power source Vcc. Accordingly, a basic output signal of the output node (d) of the control unit 260 is kept at a high level.

Since the base node of the transistor TR1 is connected to the output node of the comparator unit 250 and the output node (d) of the controller 260, and if the output signals of the comparator unit 250 and the control unit 260 are both at a high level, a current flows between the collector node and the emitter node of the transistor TR1. Accordingly, the coil of the relay RL1 is driven, and the contact point of the relay RL1 is activated. If at least one of the output signals of the comparator unit 250 and the control unit 260 is at a low level, a current flowing between the collector node and the emitter node of the transistor TR1 is cut off. Accordingly, the coil of the relay RL1 is not driven, and the contact point of the relay RL1 is inactivated. In this manner, the contact point of the relay RL1 is activated according to at least one of the output signals of the comparator unit 250 and the control unit 260.

In order to stabilize an operation of the transistor TR1, the power supply apparatus may be provided with a resistance connected to the base node or connected between the base node and the emitter node.

The circuit configuration of the no-power contact point unit described above represents an example of activating the contract point of the relay RL1 according to a plurality of output signals, or inactivating the contact point of the relay RL1 according to at least one of the plurality of output signals. However, embodiments are not limited thereto, and the activating/inactivating of the contact point of the relay R1 may be implemented using other components or configurations.

The temperature detector unit 240 may be provided with a thermistor, a Resistance Thermometer Detector, or a thermocouple so as to detect the temperature of the load 210. The temperature detector unit 250 detects the temperature of the load 210 while making contact with the load 210 or while being adjacent to the load 210. The temperature detector unit 240 according to one example may use a thermistor Rth as a component to detect of the temperature of the load 210. The circuit configuration of the temperature detector unit 240 may be described in detail with reference to FIG. 3.

Figure 3:
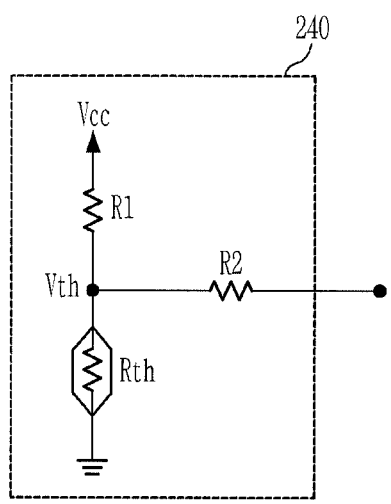
FIG. 3 is a circuit diagram schematically illustrating a temperature detector unit of the power supply apparatus of FIG. 2.

FIG. 3 is a circuit diagram schematically illustrating a temperature detector unit of the power supply apparatus of FIG. 2. Referring to FIG. 3, the temperature detector unit 240 is provided with a thermistor Rth and a plurality of resistances, which include a first resistance R1 and a second resistance R2, connected to the thermistor Rth.

A node at one side of the thermistor Rth is connected to a node at one side of the first resistance R1 and to a node at one side of the second resistance R2, and a node at the other side of the thermistor Rth is grounded. A node at the other side of the first resistance R1 is connected to the driving power source Vcc, and a node at the other side of the second resistance R2 is connected to an input node of the comparator unit 250.

The intensity of voltage of Vth is determined by the following equation 1.

$$Vth = \frac{Rth}{R1 + Rth} Vcc \qquad \text{[Equation 1]}$$

The thermistor Rth, according to Negative Temperature Coefficient characteristic, has a resistance value decreased with the increase in the temperature and increased with the decrease in the temperature. Accordingly, if the temperature is increased, the intensity of the voltage of Vth is decreased, and if the temperature is decreased, the intensity of the voltage of Vth is increased. The intensity of voltage of Vth varying with the temperature may correspond to the temperature of the load 210 detected by the temperature detector unit 240.

The voltage of Vth may be output to the input node of the comparator unit 250 and an input node (a) of the control unit 260 through the second resistance R2. The input node (a) of the control unit 260 represents an Analog to Digital Converter input node, to which a digital signal corresponding to the intensity of the voltage of Vth is input.

The comparator unit 250 compares the output of the temperature detector unit 240 with a reference voltage, and outputs the result of comparison to the no-power contact point unit 230. The circuit configuration of the comparator unit 250 will be described with reference to FIG. 4 in detail.

Figure 4:
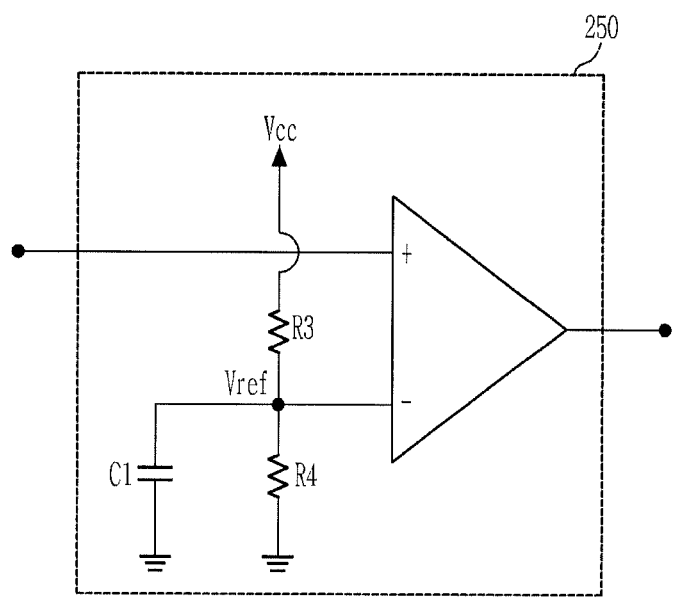
FIG. 4 is a circuit diagram schematically illustrating a comparator unit of the power supply apparatus of FIG. 2.

FIG. 4 is a circuit diagram schematically illustrating a comparator unit of the power supply apparatus of FIG. 2. Referring to FIG. 4, the comparator unit 250 is provided with an operational amplifier. The voltage of Vth is input to a non-inverting input node(+) of the operational amplifier, and the reference voltage, that is, Vref, is input to an inverting input node (−) of the operational amplifier.

The non-inverting input node of the operational amplifier is connected to one side of a third resistance R3, one side of a fourth resistance R4, and one side of a condenser C1. The other side of the third resistance R3 is connected to the driving power source Vcc, the other side of the fourth resistance R4 is grounded, and the other side of the condenser C1 is grounded. The condenser C1 is connected to the non-inverting input of the operational amplifier such that the voltage of Vref of the condenser C1 is input with stability.

The intensity of voltage of Vref is determined by the following equation 2.

$$Vref = \frac{R4}{R3 + R4} Vcc \qquad [\text{Equation 2}]$$

The operational amplifier compares the intensity of voltage of Vth with the intensity of voltage of Vref, and outputs a signal at a high level if the intensity of voltage of Vth is higher than the intensity of voltage of Vref. The operational amplifier outputs a signal at a low level if the intensity of voltage of Vth is lower than the intensity of voltage of Vref. The intensity of voltage of Vref may correspond to a reference temperature that is set in advance.

That is, since the intensity of voltage of Vth may be changed according to the combination of the third resistance R3 and the fourth resistance R4, the reference temperature may be set to be above the highest temperature of the load 210 that normally operates. Accordingly, in a normal operation, the output signal of the operational amplifier is kept at a high level before the temperature of the load 210 detected by the temperature detector unit 240 becomes higher than the reference temperature, that is, before the intensity of voltage of Vth becomes lower than the intensity of voltage of Vref.

The control unit 260 controls the overall operation of the power supply apparatus. The control unit 26Q is provided with a plurality of input/output nodes (a, b, c, d, e, and f). The input nodes (a, b) are supplied with the temperature of the load 210 detected by the temperature detector unit 240 and the intensity of the power voltage detected by the high voltage detector unit 270. The output nodes (d, e, f) output a signal to control the on/off of the switch 220, an output signal to inactivate the contact point of the relay RL1, and a signal to control the alarming unit 290. The input/output node (c) is connected to the memory unit 280 so as to be supplied with information for tracing the temperature of the load 210 detected by the temperature detector unit 240 from the memory unit 180, or so as to allow the memory unit 280 to store information on the error state of the power supply apparatus.

The output node (e) of the control unit 260 is connected to the switch 220 to control the on-off of the switch 220. The control unit 260 controls the on-off of the switch 220 through a control signal, thereby applying to or shutting off a power supply to the load 210. Since the output node (d) of the control unit 260 is connected to the base node of the transistor TR1 that drives the coil of the relay RL1, and if the output signal of the control unit 260 is at a low level, the contact point of the relay RL1 becomes inactivated, and if the output signal of the control unit 260 is at a high level, the contact point of the relay RL1 becomes activated. That is, by activating or inactivating the contact point of the relay RL1, the power voltage may be supplied to or shut off with respect the load 210.

The high voltage detector unit 270 may be provided with a plurality of resistances including a fifth resistance R5 and a sixth resistance R6 to detect the intensity of the power voltage. One side of the fifth resistance R5 is connected to the outside power source, and the other side of the fifth resistance R5 is connected to the sixth resistance R6 and to the input node (b) of the control unit 260. The other side of the sixth resistance R6 is grounded.

The intensity of voltage of Vhv is determined by the following equation 3.

$$Vhv = \frac{R6}{R5 + R6} Vp \qquad [\text{Equation 3}]$$

Herein, Vp represents the intensity of a power voltage that is supplied by the outside power source. If the intensity of power voltage supplied by the outside power source is increased, the intensity of voltage of Vhv becomes higher; and if the intensity of power voltage supplied by the outside power source is decreased, the intensity of voltage of Vhv becomes lower. That is, the intensity of voltage of Vhv is in proportion to the intensity of the power voltage supplied by the outside power source.

The voltage of Vhv is connected to the input node (b) of the control unit 260, and the input node of the control unit 260 represents an Analog to Digital Converter (ADC) input node, to which a digital signal corresponding to the intensity of the voltage of Vhv is input. Since the intensity of voltage of Vhv is proportion to the intensity of the power voltage supplied by the outside power source, the control unit 260 may calculate the intensity of the power voltage supplied by the outside power source according to the intensity of voltage of Vhv.

The memory unit 280 is provided with a read-only memory (ROM) or a flash memory that is programmable in advance. The memory unit 280 stores a temperature table that is used to trace the detected temperature of the load 210 in advance. In addition, the memory unit 280 stores information on the error state of the power supply apparatus through the control unit 260.

The alarming unit 290 reports the error state of the power supply apparatus according to the control signal of the control unit 260 to the outside. The alarming apparatus 290 may be provided with a display apparatus or a speaker apparatus to report the error state of the power supply apparatus to an outside in a visual or auditory manner.

Figure 5:
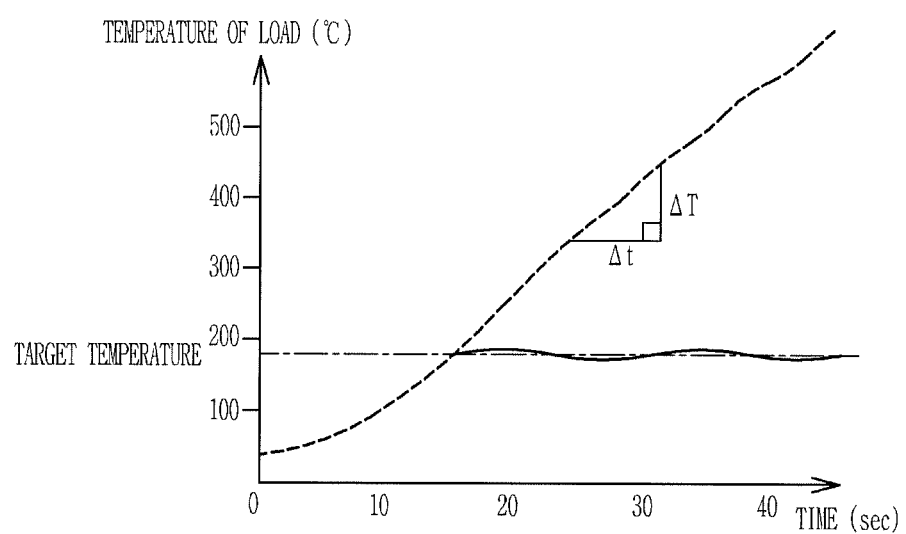
FIG. 5 is a diagram schematically illustrating the normal temperature and the abnormal temperature of a load.

FIG. 5 is a diagram schematically illustrating the normal temperature and the abnormal temperature of a load. Referring to FIG. 5, as the power voltage is applied to the load 210, the temperature of the load 210 is increased. The power supply apparatus, if the temperature of the load 210 is higher than the target temperature, shuts off the power voltage supplied to the load 210, and if the temperature of the load 210 is lower than the target temperature, applies the power voltage to the load 210. Accordingly, the temperature (a solid line on FIG. 5) of the load 210 is maintained while alternating with respect to the target temperature within a normal temperature range. However, if the power supply apparatus has an error operation, the temperature (a dotted line on FIG. 5) of the load 210 may abnormally increase. In this case, the variation (ΔT/Δt) of the temperature of the load 210 for a unit time is significantly large. According to an aspect of one or more embodiments, even if the power supply apparatus has an erroneous operation and fails to turn off the switch 220 to shut off the power voltage supplied to the load 210, the load 210 is prevented from being overheated by inactivating the contact point of the relay RL1.

Figure 6:
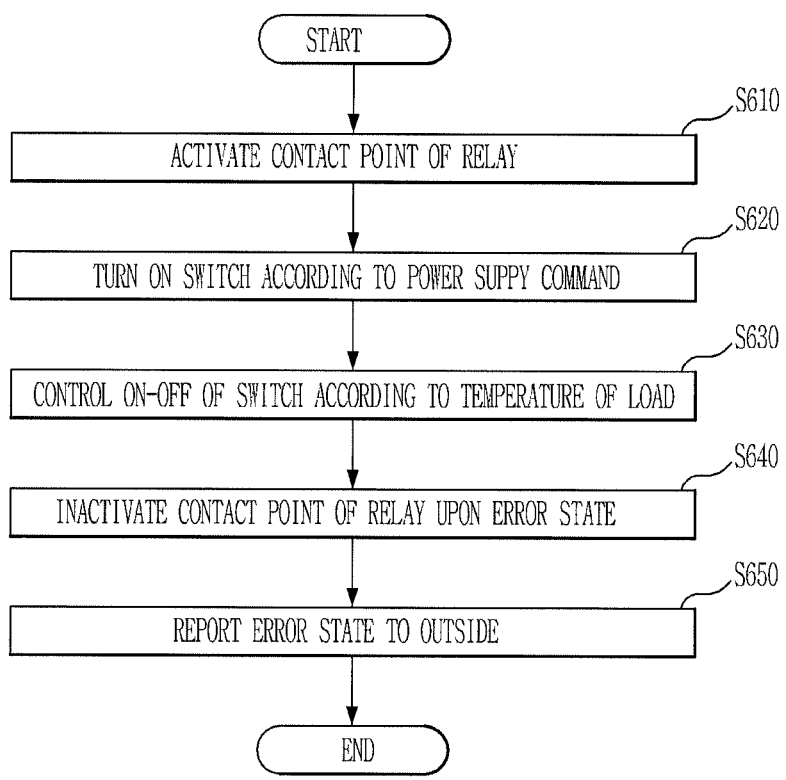
FIG. 6 is a flow chart schematically illustrating a method of controlling a power supply apparatus in accordance with an embodiment.

FIG. 6 is a flow chart schematically illustrating a method of controlling a power supply apparatus in accordance with an embodiment. Referring to FIG. 6, a no-power contact point is formed by activating the contact point of the relay RL1 before a power voltage is applied to the load 210 (610). The comparator unit 250 compares the temperature of the load 210 detected by the temperature detector unit 240 with the predetermined reference temperature, and outputs a signal to activate the contact point of the relay (RL1) if the detected temperature of the load 210 is lower than the reference temperature. The no-power contact point unit 230 activates the contact point of the relay RL1 according to the output of the comparator unit 250.

In detail, the operational amplifier of the comparator unit 250 compares the intensity of voltage of Vth with the intensity of voltage of Vref. Since the load 210 has a lower temperature before a power voltage is applied to the load 210, the thermistor Rth has a high resistance value. Accordingly, the intensity of voltage of Vth is greater than of Vref, so that the operational amplifier outputs a signal at a high level.

As described above, since the output node (d) of the control 260 maintains a basic output signal at a high level, a current flows between the collector node and the emitter node of the transistor TR1, and the coil of the relay RL1 is driven so that the contact point of the relay RL1 is activated.

In this state, the contact point of the relay RL1 is activated, but the power voltage supplied from the outside power source is not applied to the load 210 since the switch 220 is not turned on by the control unit 260 yet. According to an aspect of one or more embodiments, the contact point of the relay RL1 electrically connects the load 210 to the switch 220, so that a no-power contact point is formed, thereby preventing arc from occurring when a high voltage is supplied from the outside power source. That is, the contact point of the relay RL1 is activated before a high voltage direct current (HVDC) supplied from the outside power source is applied to the load 210, thereby preventing an arc from occurring by a HVDC. In addition, even in a case that the outside power source supplies a high voltage alternating current (AC), a high stability is ensured in supplying power.

The control unit 260 turns on the switch 220 according to a power supply command that is input to the control unit from outside of the power supply apparatus such that a power voltage is supplied to the load 210 (620). A control signal to turn on the switch is output from the output node (e) of the control unit 260, and the switch 220 is turned on according to the control signal. As a result, a power supply is supplied to the load 210, and the temperature of the load 210 is increased.

The control unit 260 maintains the temperature of the load 210 at a target temperature, which is set in advance, by controlling the on-off of the switch 220 according to the temperature of the load 210 detected by the temperature detector unit 240 (630). The control unit 260 turns off the switch 220 if the detected temperature of the load 210 is higher than the target temperature, and turns on the switch 220 if the detected temperature of the load 210 is lower than the target temperature, thereby maintaining the target temperature. If the switch 220 is turned off and a power voltage supplied to the load 210 is shut off, the temperature of the load 210 is decreased, and if the switch 220 is turned on and a power voltage is applied to the load 210, the temperature of the load 210 is increased.

The memory unit 280 stores a temperature table used to trace the detected temperature of the load 210. The voltage of Vth is input to an Analog to Digital Converter (ADC) input node of the control unit 260, and a digital signal corresponding to the voltage of Vth is input into the control unit 260. The control unit 260 may calculate the temperature of the load 210 according to the intensity of voltage of Vth through the temperature table stored in the memory unit 280.

The switch 220 is implemented as a semiconductor circuit of an Insulated Gate Bipolar Transistor (IGBT) or a Field Effect Transistor (FET), so an electric noise, such as a static electricity or a surge, may break the switch 220. If the switch 220 is broken while in a state of turn-off, the power voltage is not supplied to the load 210, no accident may occur. However, if the switch 220 is broken while in a state of turn-on, an accident may occur. That is, in a case that the control unit 260 outputs a control signal to turn off the switch 220 when the detected temperature of the load 210 is higher than the target temperature, the switch 220, which is broken, is not turned off. Accordingly, the power voltage is continuously supplied to the load 210 and the load 210 is rapidly overheated, and thus a fire may occur.

Accordingly, in an error state at which the temperature of the load 210 is abnormally increased, the contact point of the relay RL1 needs to be inactivated (640). According to one or more embodiments, at least one of the control unit 260 and the comparator unit 250 outputs a signal to inactivate the contact point of the relay RL. That is, according to an aspect of one or more embodiments, in a case that the switch 220 is broken and the load 210 is overheated, the temperature of the load 210 is detected so as to inactivate the contact point of the relay RL1 and shut off the power voltage, thereby preventing a fire from being developed due to the load 210 overheated. A method of inactivating the contact point of the relay RL1 at a first error state or a second error state will be described with reference to FIG. 7 in detail.

Figure 7:
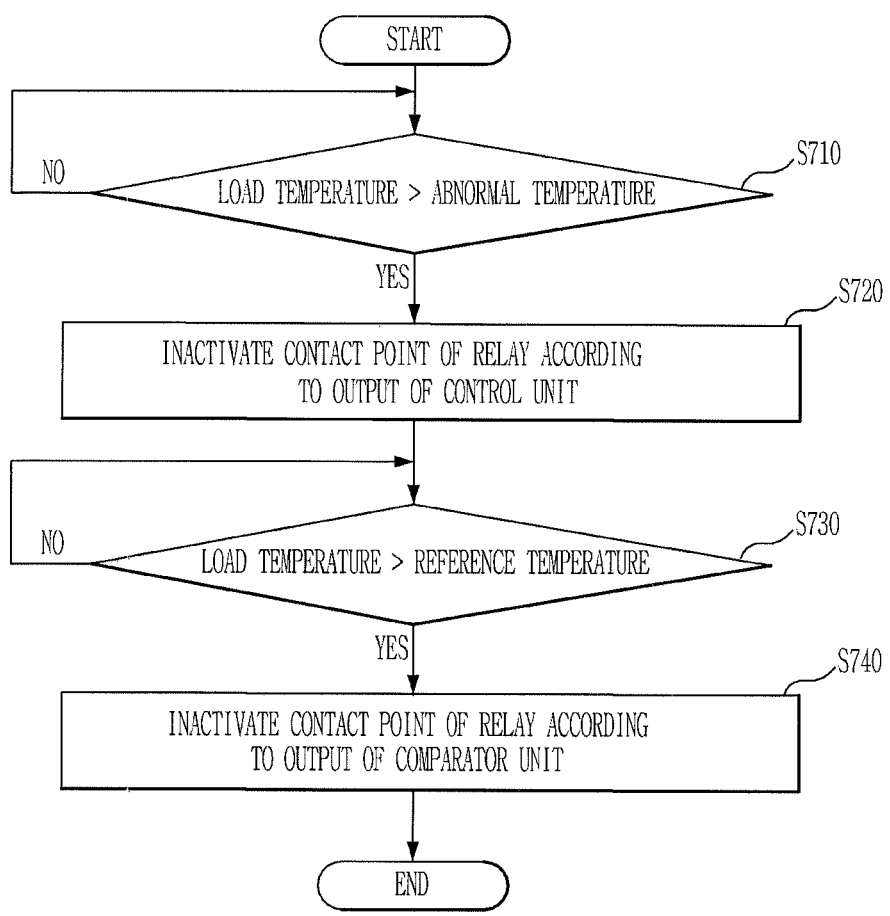
FIG. 7 is a flow chart schematically illustrating a process of inactivating a contact point of a relay at a first error state and a second error state.

FIG. 7 is a flow chart schematically illustrating a process of inactivating a contact point of a relay at a first error state and a second error state. Referring to FIG. 7, the control unit 260 determines whether the temperature of the load 210 detected through the temperature table stored in the memory unit 280 is higher than an abnormal temperature (710). To this end, the temperature table stored in the memory unit 280 includes a normal range of the temperature of the load 210 and an abnormal range of the temperature of the load 210. The normal range of the temperature of the load 210 is set to be in a range below the abnormal temperature that is set in advance. The abnormal range of the temperature of the load 210 is set to be in a range above the abnormal temperature and below the reference temperature that is set in advance. A state, at which the temperature of the load 210 is higher than the abnormal temperature and lower than the reference temperature, may be defined as the first error state. For the first error state, a software protection function of the control unit 260 is performed as follows.

For the first error state, the control unit 260 outputs a signal to inactivate the contact point of the relay RL1, and the non-power contact point unit 230 inactivates the contact point of the relay RL1 according to the output of the control unit 260 (720). In detail, if the output signal of the control unit 260 is at a low level, a current flowing between the collector node and the emitter node of the transistor TR1 is electrically cut off, so that the coil of the relay RL1 is not driven and the contact point of the relay RL1 is inactivated. As described above, the contact point of the relay RL1 of the no-power contact point unit 230 is inactivated according to at least one of the output signal of the comparator unit 250 and the output signal of the control unit 260.

Similar to the breakage of the switch 220, the output node (d) of the control unit 260 may be broken. In this case, even if the control unit 260 outputs the output signal, the contact point of the relay RL1 may not be inactivated and thus the power voltage may continuously be supplied to the load, causing the load 210 to be overheated. In order to prevent such a case, the comparator unit 250 determines whether the detected temperature of the load 210 is higher than the reference temperature set in advance (730). If the detected temperature of the load 210 is higher than the reference temperature, the comparator unit 250 outputs a signal to inactivate the contact point of the relay RL1, and the no-power contact point unit 230 inactivates the contact point of the relay RL1 according to the output of the comparator unit 250 (740). Such a state at which the temperature of the load 210 is higher than the reference temperature may be defined as the second error state. As described above, the reference temperature is determined to be in a range above the abnormal temperature.

In detail, the operational amplifier of the comparator unit 250 compares the intensity of voltage of Vth with the intensity of voltage of Vref, and when the intensity of voltage of Vth is higher than the intensity of voltage of Vref, the operational amplifier of the comparator unit 250 outputs a signal at a high level such that the contact point of the relay RL1 is activated before the power voltage is applied to the load 210. However, in a case that the output node of the control unit 260 is broken and the load 210 is overheated, the intensity of voltage of Vth corresponding to the temperature of the load 210 is decreased to be lower than the intensity of voltage of Vref corresponding to the reference temperature. In this case, the comparator unit 250 outputs a signal at a low level and the coil of the relay is not driven, so that the contact point of the relay RL1 is inactivated. That is, at the second error state, the comparator unit 250 performs the protection in a hardware scheme.

The control unit 260, as well as when the temperature of the load 210 is higher than the abnormal temperature, may output the signal to inactivate the contact point of the relay RL1 when the variation of the detected temperature of the load 210 for a unit time is larger than an abnormal variation that is set in advance. Such a state may be defined as a third error state. The outside power source supplies a high voltage direct current to the load 210, and the temperature of the load 210 may be rapidly increased. In particular, if the switch 220 is broken, the power voltage supplied to the load 210 is not shut off, so that the variation of the temperature of the load 210 for a unit time is significantly large. Accordingly, even though the temperature of the load 210 is lower that the abnormal temperature, and if the variation of the temperature of the load 210 for a unit time is larger than the abnormal vibration, the switch 220 may be determined to be broken. At this time, the control unit 260 determines whether the switch 220 is broken, and outputs a signal to inactivate the contact point of the relay RL1. As a result, the no-power contact point unit 230 inactivates the contact point of the relay RL1 according to the output of the control unit 260, and shuts off the power voltage supplied to the load 210. Accordingly, according to an aspect of one or more embodiments, the breakage of the switch 220 is determined in a rapid manner through the variation of the temperature of the load 210 for a unit time, so that the contact point of the relay RL1 is inactivated to shut off the power voltage, thereby rapidly preventing a fire from occurring due to the load 210 overheated.

In addition, even when the intensity of a power voltage detected by the high voltage detector unit 270 is greater than a predetermined intensity of a voltage that is set in advance, the control unit 260 may output a signal to inactivate the contact point of the relay RL1. Such a state may be defined as a fourth error state. The control unit 260 calculates the intensity of the power voltage supplied by the outside power source according to the intensity of voltage of Vhv of the high voltage detector unit 270. If the intensity of the power voltage falls within an abnormal range, that is, the intensity of the power voltage is higher than the intensity of an abnormal voltage, the power voltage supplied to the load 210 is shut off to protect the load 210. According to an aspect of one or more embodiments, the intensity of power voltage supplied to the load 210 is detected, and if determined that a high voltage of the abnormal range is supplied to the load 210, the contact point of the relay RL1 is inactivated and the power voltage is shut off, thereby preventing the load 210 from being broken and preventing a fire from occurring.

The control unit 260 may inactivate the contact point of the relay RL1 while storing information on the error state. The information may include information indicating a broken component between the switch 220 and the relay RL1, and the breakage time.

The control unit 260 reports the error state to an outside after the contact point of the relay RL1 is inactivated to shut off the power voltage supplied to the load 210 (650). To this end, the error state is reported to the outside through the display apparatus of the speaker apparatus of the alarming unit 290 in a visual or auditory manner. Accordingly, an alarming unit 290 can notify a user of the error state.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A power supply apparatus, which comprises a load, an outside power source to supply the load with a power voltage and a switch electrically connected between the load and the outside power source, the power supply apparatus further comprising:

a temperature detector unit configured to detect a temperature of the load;

a dry contact point unit having a relay, which is electrically connected between the load and the switch, and configured to activate a contact point of the relay before the power voltage is applied to the load;

a control unit configured to turn on the switch according to a power supply command from outside of the power supply apparatus that is input to the control unit from outside the power supply apparatus and configured to control an on/off of the switch according to the detected temperature of the load;

a comparator unit configured to compare the detected temperature of the load with a reference temperature that is set in advance; and a memory unit configured to store a temperature table, which enables the control unit to trace the detected temperature of the load, and information on at least one of a first error state, a second error state, a third error state, and a fourth error state, classified by the load's temperature, a variation of the load's temperature, and intensity of the power voltage, wherein
one of the control unit and the comparator unit is configured to determine whether at least one element in the power supply apparatus is broken based on the at least one of the first error state, the second error state, the third error state, and the fourth error state, and to output a signal to inactivate the contact point of the relay based on the determination.

2. The power supply apparatus of claim 1,
wherein the comparator unit outputs a signal to activate the contact point of the relay if the detected temperature of the load is lower than the reference temperature, and the dry contact point unit activates or inactivates the contact point of the relay according to the output of the comparator unit.

3. The power supply apparatus of claim 2, wherein the control unit turns off the switch if the detected temperature of the load is higher than a target temperature that is set in advance, and turns on the switch if the detected temperature of the load is lower than the target temperature.

4. The power supply apparatus of claim 3, wherein the control unit outputs a signal to inactivate the contact point of the relay according to the detected temperature of the load, and the dry contact point unit inactivates the contact point of the relay according to at least one of the outputs of the comparator unit and the output of the control unit.

5. The power supply apparatus of claim 4, wherein the control unit, if the detected temperature of the load represents the first error state at which the detected temperature of the load is higher than an abnormal temperature that is set in advance, outputs the signal to inactivate the contact point of the relay.

6. The power supply apparatus of claim 5, wherein the comparator unit, if the detected temperature of the load represents the second error state at which the detected temperature of the load is higher than the reference temperature that is set in advance, outputs a signal to inactivate the contact point of the relay.

7. The power supply apparatus of claim 6, wherein the reference temperature is set to be in a range above the abnormal temperature.

8. The power supply apparatus of claim 7, wherein the control unit, if a variation of the detected temperature of the load for a unit time represents the third error state at which the variation is larger than an abnormal variation that is set in advance, outputs the signal to inactivate the contact point of the relay.

9. The power supply apparatus of claim 8, further comprising a high voltage detector unit configured to detect an intensity of the power voltage,
wherein the control unit, if the detected intensity of the power voltage represents the fourth error state at which the detected intensity of the power voltage is greater than an abnormal voltage that is set in advance, outputs the signal to inactivate the contact point of the relay.

10. The power supply apparatus of claim 1, further comprising an alarming unit configured to report at least one of the first error state, the second error state, the third error state, and the fourth error state to a user.

11. A method of controlling a power supply apparatus, which comprises a load, an outside power source to supply the load with a power voltage, a switch electrically connected between the load and the outside power source, a temperature detector unit configured to detect a temperature of the load, and a dry contact point unit provided with a relay, which is electrically connected between the load and the switch, and a memory unit configured to store a temperature table, which enables the control unit to trace the detected temperature of the load, and information on at least one of a first error state, a second error state, a third error state, and a fourth error state, classified by the load's temperature, a variation of the load's temperature, and intensity of the power voltage, the method comprising:
at the dry contact point unit, activating a contact point of the relay before the power voltage is applied to the load;
at a control unit, turning on the switch according to a power supply command from outside of the power supply apparatus that is input to the control unit from outside the power supply apparatus;
at the control unit, controlling an on/off of the switch according to the detected temperature of the load.

12. The method of claim 11, wherein in the activating of the contact, of the relay, a comparator unit compares the detected temperature of the load with a reference temperature that is set in advance, and outputs a signal to activate the contact point of the relay if the detected temperature of the load is lower than the reference temperature, and the dry contact point unit activates or inactivates the contact point of the relay according to the output of the comparator unit.

13. The method of claim 12, wherein in the controlling of the on/off of the switch, the control unit turns off the switch if the detected temperature of the load is higher than a target temperature that is set in advance, and turns on the switch if the detected temperature of the load is lower than the target temperature.

14. The method of claim 13, further comprising:
at the control unit, outputting a signal to inactivate the contact point of the relay according to the detected temperature of the load; and
at the dry contact point unit, inactivating the contact point of the relay according to at least one of the output of the comparator unit and the output of the control unit.

15. The method of claim 14, wherein in the inactivating of the contact point of the relay, the control unit, if the detected temperature of the load represents the first error state at which the detected temperature of the load is higher than an abnormal temperature that is set in advance, outputs the signal to inactivate the contact point of the relay.

16. The method of claim 15, wherein in the inactivating of the contact point of the relay, the comparator unit, if the detected temperature of the load represents the second error state at which the detected temperature of the load is higher than the reference temperature, outputs a signal to inactivate the contact point of the relay.

17. The method of claim 16, wherein in the inactivating of the contact point of the relay, the reference temperature is set to be in a range above the abnormal temperature.

18. The method of claim 17, wherein in the inactivating of the contact point of the relay, the control unit, if a variation of the detected temperature of the load for a unit time represents the third error state at which the variation is larger than an abnormal variation that is set in advance, outputs the signal to inactivate the contact point of the relay.

19. The method of claim 18, wherein in the inactivating of the contact point of the relay, a high voltage detector unit detects an intensity of the power voltage, and the control unit, if the detected intensity of the power voltage represents the fourth error state at which the detected intensity of the power voltage is greater than an abnormal voltage that is set in advance, outputs the signal to inactivate the contact point of the relay.

20. The method of claim 19, further comprising reporting at least one of the first error state, the second error state, the third error state and the fourth error state to a user.

21. A power supply apparatus, comprising:
a switch electrically connected between a load and an outside power source;
a temperature detector configured to detect a temperature of the load;
a dry contact point unit having a relay, which is electrically connected between the load and the switch, and configured to activate a contact point of the relay before power is applied to the load;
a control unit, receiving a power supply command from outside of the power supply apparatus, configured to turn on the switch in response to the power supply command, and configured to control an on/off of the switch according to the temperature of the load detected;
a comparator unit configured to compare the detected temperature of the load with a reference temperature that is set in advance; and
a memory unit configured to store a temperature table, which enables the control unit to trace the detected temperature of the load, and information on at least one of a first error state, a second error state, a third error state, and a fourth error state, classified by the load's temperature, a variation of the load's temperature, and intensity of the power voltage,
wherein
the comparator unit outputs a signal to activate the contact point of the relay if the detected temperature of the load is lower than the reference temperature, and the dry contact point unit activates or inactivates the contact point of the relay according to the output of the comparator unit, and
one of the control unit and the comparator unit is configured to determine whether at least one element in the power supply apparatus is broken based on the at least one of the first error state, the second error state, the third error state, and the fourth error state, and to output a signal to inactivate the contact point of the relay based on the determination, and the dry contact point unit inactivates the contact point of the relay according to one of the output of the comparator unit and the output of the control unit.

* * * * *